(12) United States Patent
Vora et al.

(10) Patent No.: US 10,404,832 B2
(45) Date of Patent: Sep. 3, 2019

(54) MANAGEMENT OF GATEWAY DEVICE USING VIRTUAL GATEWAY DEVICE

(71) Applicant: Ayla Networks, Inc., Santa Clara, CA (US)

(72) Inventors: Jigar Vora, San Mateo, CA (US); Vishwesh Pai, Milpitas, CA (US); Haoqing Geng, Sunnyvale, CA (US); Sudha Sundaresan, San Jose, CA (US); Joseph R. Eykholt, Los Altos, CA (US); Adrian Caceres, Los Gatos, CA (US); Yipei Wang, Sunnyvale, CA (US)

(73) Assignee: Ayla Networks, Inc., Santa Clara, CA (US)

( * ) Notice: Subject to any disclaimer, the term of this patent is extended or adjusted under 35 U.S.C. 154(b) by 159 days.

(21) Appl. No.: 15/250,596

(22) Filed: Aug. 29, 2016

(65) Prior Publication Data

US 2017/0064042 A1     Mar. 2, 2017

Related U.S. Application Data

(60) Provisional application No. 62/212,503, filed on Aug. 31, 2015.

(51) Int. Cl.
*H04L 29/08* (2006.01)
*H04L 12/24* (2006.01)
(Continued)

(52) U.S. Cl.
CPC .............. *H04L 67/34* (2013.01); *H04L 12/66* (2013.01); *H04L 41/0843* (2013.01);
(Continued)

(58) Field of Classification Search
CPC ..... H04L 67/10; H04L 67/34; H04L 67/2809; H04L 67/2823; H04L 41/12;
(Continued)

(56) References Cited

U.S. PATENT DOCUMENTS 5,983,271 A    11/1999 Alexander et al.
6,091,951 A    7/2000 Sturniolo et al.
(Continued)

FOREIGN PATENT DOCUMENTS

CN      107018127 A  *  8/2017
WO    WO2002028123 A2    4/2002
(Continued)

OTHER PUBLICATIONS

International Search Report and Written Opinion of the International Searching Authority for International application No. PCT/US16/49668 dated Jan. 13, 2017.
(Continued)

*Primary Examiner* — Kostas J Katsikis
(74) *Attorney, Agent, or Firm* — Lowenstein Sandler LLP

(57) ABSTRACT

A server determines a plurality of device templates that define a plurality of device attributes of a remote device connected to a gateway device. The server creates a virtual device from the plurality of device templates, wherein the virtual device is a virtual representation of the remote device. The server determines an attribute update for a first device attribute of the remote device. The server updates a second device attribute of the virtual device. The server generates an instruction for the gateway device to initiate the attribute update for the first device attribute. The server transmits the instruction to the gateway device, wherein the instruction causes the gateway device to generate a command for the remote device to perform the attribute update on the device attribute.

20 Claims, 9 Drawing Sheets

(51) Int. Cl.
  *H04L 12/66* (2006.01)
  *H04W 4/70* (2018.01)
  *H04W 8/24* (2009.01)
  *H04W 84/18* (2009.01)
  *H04B 1/713* (2011.01)

(52) U.S. Cl.
  CPC .......... *H04L 41/12* (2013.01); *H04L 67/2809* (2013.01); *H04L 67/2823* (2013.01); *H04W 4/70* (2018.02); *H04W 8/245* (2013.01); *H04B 1/713* (2013.01); *H04W 84/18* (2013.01)

(58) Field of Classification Search
  CPC .... H04L 41/0843; H04L 12/66; H04W 4/005; H04W 4/70; H04W 84/18; H04B 1/713
  See application file for complete search history.

(56) References Cited

U.S. PATENT DOCUMENTS

| | | | |
|---|---|---|---|
| 6,198,920 B1* | 3/2001 | Doviak | H04L 12/5692 370/352 |
| 6,873,620 B1* | 3/2005 | Coveley | H04L 12/66 370/395.31 |
| 8,185,620 B1* | 5/2012 | Boone | H04L 12/66 709/218 |
| 8,387,112 B1* | 2/2013 | Ranjan | G06F 21/57 717/168 |
| 9,667,703 B1* | 5/2017 | Vetter | H04L 67/10 |
| 9,888,072 B2* | 2/2018 | Watts, Jr. | H04L 67/1095 |
| 9,985,766 B2* | 5/2018 | Scholten | H04L 5/0053 |
| 2002/0052938 A1* | 5/2002 | Kanemitsu | H04L 41/0253 709/220 |
| 2004/0031030 A1* | 2/2004 | Kidder | G06F 1/14 717/172 |
| 2004/0071148 A1 | 4/2004 | Ozaki et al. | |
| 2005/0233693 A1* | 10/2005 | Karaoguz | H04H 20/57 455/3.06 |
| 2006/0053229 A1 | 3/2006 | Choi et al. | |
| 2006/0229090 A1 | 10/2006 | LaDue | |
| 2007/0105531 A1 | 5/2007 | Schroeder, Jr. | |
| 2007/0244999 A1* | 10/2007 | Hamanaka | G06F 8/65 709/220 |
| 2008/0112416 A1* | 5/2008 | Hsieh | G06F 8/65 370/395.52 |
| 2008/0189693 A1* | 8/2008 | Pathak | G06F 8/65 717/168 |
| 2009/0073991 A1 | 3/2009 | Landrum et al. | |
| 2009/0080400 A1 | 3/2009 | Olivier et al. | |
| 2009/0182439 A1* | 7/2009 | Birze | H04L 12/2854 700/3 |
| 2009/0235174 A1* | 9/2009 | Royt | G06F 3/0613 715/735 |
| 2009/0257474 A1* | 10/2009 | Tuttle | G06K 7/10356 375/133 |
| 2010/0045619 A1* | 2/2010 | Birnbaum | H04W 4/21 345/173 |
| 2010/0165876 A1* | 7/2010 | Shukla | H04L 41/0806 370/254 |
| 2010/0165877 A1* | 7/2010 | Shukla | H04L 41/0843 370/254 |
| 2010/0169467 A1* | 7/2010 | Shukla | H04L 41/12 709/220 |
| 2010/0205596 A1* | 8/2010 | Chung | H04L 41/082 717/172 |
| 2011/0149932 A1* | 6/2011 | Kim | H04L 12/2836 370/338 |
| 2011/0276668 A1* | 11/2011 | Fang | H04L 41/00 709/221 |
| 2012/0311181 A1 | 12/2012 | Smith et al. | |
| 2013/0082826 A1 | 4/2013 | Chandra et al. | |
| 2013/0086245 A1 | 4/2013 | Lu et al. | |
| 2013/0272317 A1 | 10/2013 | Matsumura | |
| 2014/0006354 A1 | 1/2014 | Parkison et al. | |
| 2014/0007076 A1* | 1/2014 | Kim | H04W 4/70 717/173 |
| 2015/0010159 A1 | 1/2015 | Tran et al. | |
| 2015/0040115 A1* | 2/2015 | Capper | G06F 8/65 717/171 |
| 2015/0074259 A1 | 3/2015 | Ansari et al. | |
| 2015/0110119 A1* | 4/2015 | Aubert | H04W 4/005 370/401 |
| 2015/0163196 A1* | 6/2015 | Bhagwat | H04L 61/2061 709/245 |
| 2015/0264138 A1* | 9/2015 | Watts, Jr. | H04L 67/1095 709/203 |
| 2015/0365217 A1* | 12/2015 | Scholten | H04L 5/0053 370/315 |
| 2016/0014787 A1* | 1/2016 | Zhang | H04W 4/70 370/329 |
| 2016/0095044 A1* | 3/2016 | Maria | H04L 12/4641 370/329 |
| 2016/0255066 A1* | 9/2016 | Green | H04W 4/70 726/4 |
| 2016/0285759 A1 | 9/2016 | Ryan et al. | |
| 2016/0330140 A1* | 11/2016 | Cook | H04L 12/4641 |
| 2016/0337206 A1* | 11/2016 | Bugenhagen | H04L 67/34 |
| 2017/0026157 A1* | 1/2017 | Bugenhagen | H04L 5/0053 |
| 2017/0039058 A1* | 2/2017 | Zhu | G06F 8/65 |
| 2017/0054594 A1* | 2/2017 | Decenzo | H04L 67/12 |
| 2017/0063968 A1* | 3/2017 | Kitchen | H04L 67/10 |
| 2017/0111153 A1* | 4/2017 | Scholten | H04L 5/0053 |
| 2017/0111227 A1* | 4/2017 | Papageorgiou | H04W 4/70 |
| 2017/0244635 A1 | 8/2017 | Felemban et al. | |

FOREIGN PATENT DOCUMENTS

| | | | | |
|---|---|---|---|---|
| WO | WO 2013181918 A1 | * | 12/2013 | .......... H04L 4/2425 |
| WO | WO-2017040534 A1 | * | 3/2017 | ............. H04W 4/70 |
| WO | WO-2017040636 A1 | * | 3/2017 | ............. H04W 4/70 |

OTHER PUBLICATIONS

International Search Report and Written Opinion of the International Searching Authority for International application No. PCT/US16/49501 dated Dec. 30, 2016.

USPTO, Non-Final Office Action for U.S. Appl. No. 15/251,505 dated Sep. 24, 2018.

USPTO, Final Office Action for U.S. Appl. No. 15/251,505 dated Mar. 6, 2019.

* cited by examiner

MANAGEMENT OF GATEWAY DEVICE USING VIRTUAL GATEWAY DEVICE

RELATED APPLICATIONS

The present application claims the benefit of U.S. Provisional Patent Application No. 62/212,503 filed Aug. 31, 2015, which is incorporated by reference herein.

BACKGROUND

Gateway devices are devices that interconnect networks with different network protocol technologies by performing protocol conversions between the different network protocol technologies. Generally, a gateway device includes firmware that defines types of devices that may be managed by the gateway device, the device attributes of these devices, and how to communicate with and control these devices. The gateway device populates a local data store with information on a local network, including information on all of the local devices managed by the gateway, how to communicate with these devices, capabilities (e.g., device attributes) of these devices, and so on.

New types of devices are frequently developed. When a new device and/or new device attribute is developed, the firmware of a gateway device traditionally needs to be updated with information about that new device or new device attribute to enable the gateway device to manage that new device or to control the new device attributes. Absent such a firmware update, the gateway device may be unable to send commands to the new device, unable to understand responses from the new device, unable to use particular features of the new device, and so on. However, updating firmware of a gateway device consumes system resources and takes time. Additionally, each time device firmware is updated there is a chance that the firmware update will be unsuccessful and/or render the device non-functional.

BRIEF DESCRIPTION OF THE DRAWINGS

Reference will now be made to the accompanying drawings showing example embodiments of the present application, and in which.

DETAILED DESCRIPTION

Figure 1:
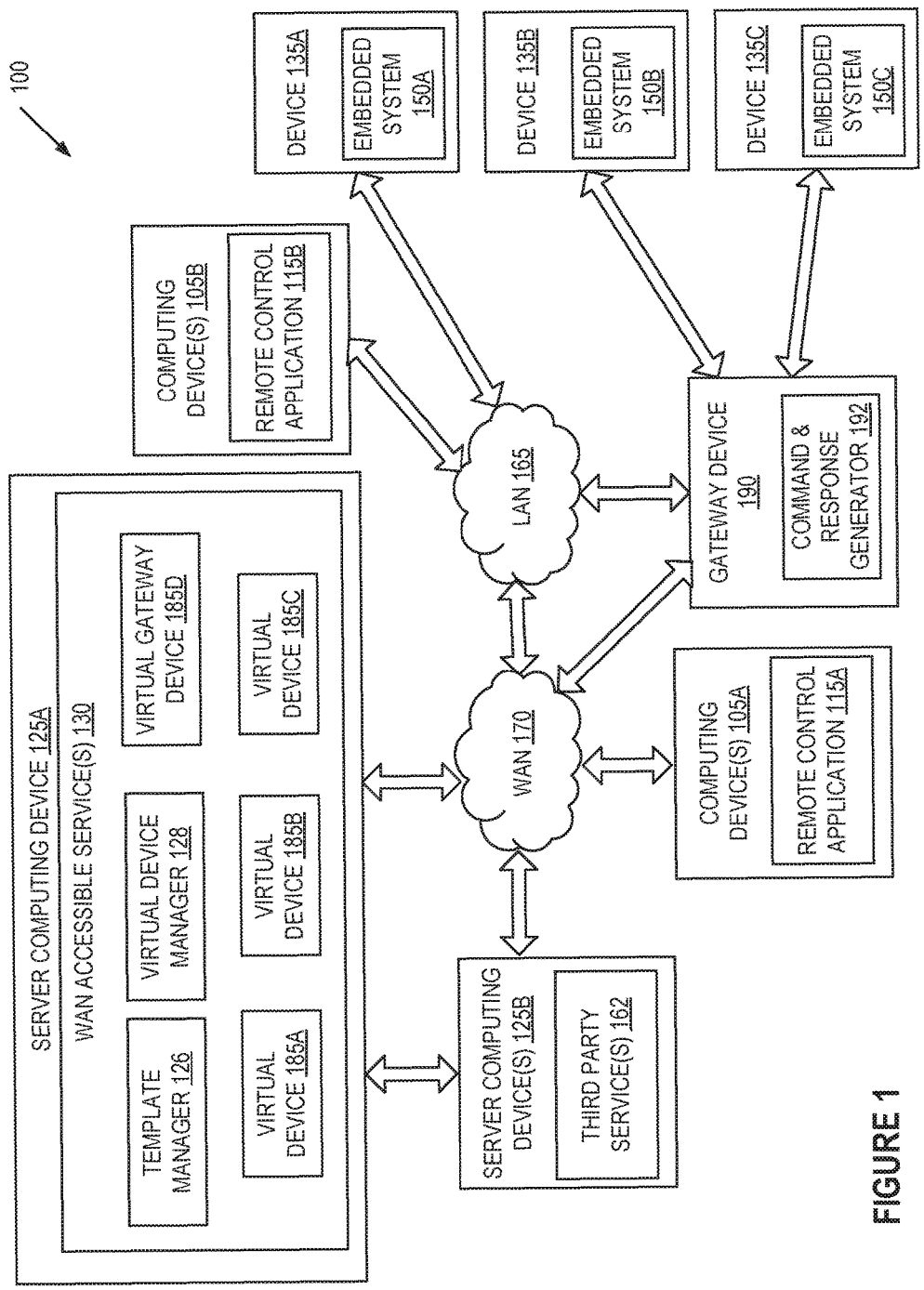
FIG. 1 is a block diagram depicting an example network architecture including remotely accessible devices and computing devices that interact with the remotely accessible devices.

Embodiments are directed to a network-connected device platform (also referred to as an internet-of-things (IoT) cloud platform or simply an IoT platform) that implements a virtual gateway device to control a gateway device and devices managed by the gateway device. A device may have many properties or attributes that can be controlled by a user and many properties or attributes that may be used for monitoring and data collection purposes. Some devices do not have network interfaces for connecting to an internet protocol (IP) network (e.g., do not include a WI-FI™ network adapter or an Ethernet network adapter). Gateway devices such as ZIGBEE® gateways and BLUETOOTH® gateways may interconnect such devices to an IP network and through the IP network to a server computing device of the network-connected device platform. Embodiments described herein provide a "thin" gateway model in which a virtual gateway device running in the cloud (e.g., on a server computing device) handles a majority of the smarts/knowledge for translating between communication protocols and managing devices using a particular communication protocol. This enables the virtual gateway device to perform many of the operations that a gateway device traditionally performs (e.g., protocol translation operations), and essentially transforms the gateway device into a router of commands in the particular communication protocol. For example, a virtual ZIGBEE® gateway may be used, which contains information for translating between an instruction format used by the IoT cloud platform and ZIGBEE® commands. Thus, the physical ZIGBEE® gateway may then essentially operate as a simple router of ZIGBEE® commands. Similarly, a virtual BLUETOOTH® gateway may contain information for translation between the instruction format used by the IoT cloud platform and BLUETOOTH® commands. Other possible types of gateways that may be used in embodiments include building automation and control networks (BACNET™) gateways, power-line communication (PLC) gateways, and so on.

In embodiments, gateway devices contain minimal firmware that does not define types of devices that may be managed by the gateway device, the device attributes of these devices, and/or how to communicate with or control these devices. The gateway devices also may not include a local data store with information on a local network of devices managed by the gateway devices (e.g., including information on all of the local devices managed by the gateway, how to communicate with these devices, capabilities (e.g., device attributes) of these devices, etc.). Instead, the information defining the types of devices that may be managed by the gateway device, the device attributes of these devices, and/or how to communicate with and control these devices is maintained by the virtual gateway device that runs on the server computing device. The virtual gateway device may also include a data store with information on a network managed by the gateway device (e.g., including information on all of the devices managed by the gateway, how to communicate with these devices, capabilities (e.g., device attributes) of these devices, commands usable to control these devices, etc.).

By maintaining the information on how to control the various types of devices, the network of devices managed by the gateway device, and so on in the virtual gateway device, numerous advantages may be achieved in some embodiments described herein. For example, if such information is maintained at the server computing device (e.g., at the virtual gateway device on the server computing device) rather than the physical gateway device, then new types of devices and device properties may be supported without updating a firmware of the gateway device. Such changes may occur even after the gateway device has been deployed to the field (e.g., to a customer location). This may shorten and simplify a product development cycle for gateway devices.

A flexible templating framework may use one or multiple device templates to define and generate a virtual gateway device for a physical gateway device and virtual devices for each of the devices managed by the physical gateway device. Each template is a model of a device (or a component, feature or feature set of a device) that captures the physical and behavioral attributes or properties of the device. The terms device attributes and device properties will be used interchangeably herein. The virtual devices may inherit the device attributes of each of the templates used to generate the virtual devices. Thus, if a new type of device is to be added to a network, support for the new device may be added simply by adding one or more new templates to the templating framework. These new templates may then be used to update or generate the virtual gateway device and to generate a virtual device for the new type of device.

In one embodiment, a server computing device receives a message from a gateway device after the gateway device connects to a remote device, the message including device attributes of the remote device. The server computing device determines device templates that define the device attributes and creates a virtual device from the device templates, wherein the virtual device inherits the device attributes from the plurality of device templates. In some instances, the server computing device may additionally determine a device template to use for updating a virtual gateway device that will manage the device (and the virtual device).

In a further embodiment, the server computing device (e.g., a virtual gateway device running on the server computing device) determines an attribute update for a first device attribute of a remote device managed by a gateway device. The server computing device generates an instruction for the gateway device to initiate the attribute update for the first device attribute and transmit the instruction to the gateway device. The instruction may include all information that might be needed for the gateway device to command the remote device to perform the attribute update, and may cause the gateway device to generate such a command. The server computing device may additionally update a corresponding device attribute of the virtual device that is a virtual representation of the remote device.

In another embodiment, a gateway device receives an instruction from a server computing device (e.g., from a virtual gateway device running on a server computing device) to initiate an attribute update for a device attribute of a device managed by the gateway device. The gateway device parses the instruction to determine data usable to cause the device to perform the attribute update on the device attribute. The gateway device generates a command for the remote device to perform the attribute update based on the data. The gateway device then transmits the command to the device using a communication protocol associated with the device.

Referring now to the figures, FIG. 1 is a block diagram depicting an example network architecture 100 including remotely accessible devices 135A-C and computing devices 105A-B, 125A, 125B that interact with the remotely accessible devices 135A-C. The network architecture 100 includes the multiple devices 135A-C connected to a local area network (LAN) 165. Thus, the devices 135A-C may be referred to as network-connected devices. Some of the devices 135B-C lack connectivity to an internet protocol (IP) network, and thus connect to the LAN 165 and computing devices 105A-B, 125A, 125B via a gateway device 190.

In one embodiment, the devices 135A-C are devices with embedded systems 150A-C, and may include, for example, electrical appliances such as refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, signs, electronic billboards, sprinkler systems, and irrigation control systems, as well as medical devices. The embedded systems 150A-C may also be referred to as network-connected devices. Devices 135A-C may also be any other type of device that includes an embedded system. Alternatively, one or more devices 135A-C may not include an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to LAN 165, to gateway device 190, or to a wireless carrier network (e.g., that is implemented using various data processing equipment, communication towers, etc.). The communication module may be configured to manage security, manage sessions, manage access control, manage communications with external devices, and so forth.

In one embodiment, the communication module of embedded system 150A is configured to communicate using WI-FI™ or another internet protocol (IP) such as Ethernet. Communication modules may also be configured to communicate with a wireless carrier network using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

The LAN 165 includes a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a WI-FI™ transceiver.

Some embedded systems 150B-C may not support any of the communication types supported by the network device. In one embodiment, the communication modules of embedded systems 150B-C do not include IP network adapters (e.g., WI-FI™ adapters or Ethernet adapters), and are not capable of directly connecting to LAN 165. Instead, the communication modules of embedded systems 150B-C may be configured to communicate using BLUETOOTH®, ZIG-BEE®, power line communication (PLC), or other communication protocols. For example, devices 135B-C may support the ZIGBEE® wireless protocol or BLUETOOTH®. ZIGBEE® is a collection of wireless mesh network protocols. BLUETOOTH® is a frequency-hopping spread spectrum (FHSS) wireless communication protocol that uses short-wavelength ultra-high frequency (UHF) radio waves in the industrial, scientific and medical (ISM) radio band from 2.4 to 2.485 GHz. To enable such devices to connect to the LAN 165, the LAN 165 includes gateway device 190 connected to the network device via one of the connection types supported by the network device (e.g., via Ethernet or WI-FI™). Alternatively, the network device of the LAN 165 and the gateway device 190 may be combined into a single device.

In addition to supporting TCP/IP protocols, the gateway device 190 may additionally support other communication protocols such as ZIGBEE®, BACNET™, PLC and/or BLUETOOTH®, and may translate between supported communication protocols. Accordingly, some devices (e.g., devices 135B-C) may connect to the LAN 165 and/or to the WAN 170 through the gateway device 190. In one embodiment, gateway device 190 includes one or more IP network adapters (e.g., WI-FI™ adapters, Ethernet adapters, etc.) and one or more type of non-IP network adapters (e.g., one or more network adapters for ZIGBEE® communications (referred to as a ZIGBEE® gateway) or one or more network adapters for BLUETOOTH® communications (referred to as a BLUETOOTH® gateway)). The gateway device 190 may manage a network of devices that includes multiple devices 135B-C that share a common communication protocol.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to one or more server computing devices 125A-B. The server computing devices 125A-B may include physical machines and/or virtual machines hosted by physical machines. The physical machines may be rackmount servers, desktop computers, or other computing devices. In one embodiment, the server computing devices 125A-B include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Server computing device 125A hosts one or more WAN-accessible services 130, which may be a web based service and/or a cloud service (e.g., a web based service hosted in a cloud computing platform). A WAN-accessible service 130 may maintain a session (e.g., via a continuous or intermittent connection) with one or more of the embedded systems 150A-C. Alternatively, the WAN-accessible service 130 may periodically establish sessions with the embedded systems 150A-C. Sessions and connections may be between a virtual device 185A-C running on the server computing device 125A and the devices 135A-C. Sessions and connections may also be established between a virtual gateway device 185D running on the server computing device 130 and gateway device 190. Communications between virtual devices 185B-C and devices 135B-C may be facilitated by virtual gateway device 185D and gateway device 190.

Via a session with an embedded system 150A-C (or device 135A-C), WAN-accessible service 130 may use an appropriate virtual device 185A-C to issue commands to the embedded system (or device 135A-C) and/or receive status updates from the embedded system (or device 135A-C). Thus, the virtual device 185A-C may be used to control the device 135A-C. The commands may be commands to change a state of one or more properties or attributes of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded systems 150A-C may identify values or states of some or all detectable properties or attributes of devices 135A-C that the embedded systems are included in. A property (also referred to as an attribute) may be represented as a name-value pair (also referred to as a key-value pair). The name/key represents a property, and the value represents a status of the property. Status updates may also include fault information, statistical device usage information, trace data and/or other information. Such values, states and/or other information may change based on direct user interaction with the devices. Such values, states and/or other information may also change responsive to commands sent to the embedded systems 150A-C by the WAN-accessible service 130 and/or by computing devices 105A-B via an appropriate virtual device 185A-C. Moreover, values, states and other information of the embedded systems 150A-C may change based on environmental conditions of the embedded systems. By maintaining or periodically establishing sessions with the embedded systems 150A-C, the WAN-accessible services 130 may maintain up-to-date information on the devices 135A-C, and such up-to-date information may be reflected in a virtual device 185A-C.

In one embodiment, the virtual gateway device 185D and gateway device 190 enable communication between the virtual devices 185B-C and the devices 135B-C that are connected to LAN 165 via gateway device 190. If a change of an attribute or parameter is initiated on a virtual device 185B-C, the virtual device notifies the virtual gateway device 185D. The virtual gateway device 185D may then generate an instruction for the gateway device to initiate the change of the attribute or property on the corresponding device 135B-C, and may send the instruction to the gateway device 190. Alternatively, virtual gateway device 185D or another module of WAN-accessible services 130 may initiate a change of an attribute or parameter of a device 135B-C, and may generate and send an instruction to gateway device 190. In one embodiment, the instruction is a string. For example, the instruction may be a Javascript object notation (JSON) encoded string that can be parsed and decoded by gateway device 190.

Gateway device 190 may contain minimal firmware that does not define types of devices that may be managed by the gateway device, the device attributes of these devices, and/or how to communicate with or control these devices. The gateway device 190 also may not include a local data store with information on a local network of devices managed by the gateway device (e.g., including information on devices 135B-C, how to communicate with these devices, capabilities (e.g., device attributes) of these devices, commands accepted by these devices, etc.). Instead, in embodiments the information defining the types of devices that may be managed by the gateway device 190, the device attributes of these devices, commands accepted by these devices and/or how to communicate with or control these devices is maintained by the virtual gateway device 185D. The virtual gateway device 185D may also include a data store with information on a network of devices managed by the gateway device 190 (e.g., including information on all of the devices managed by the gateway, how to communicate with these devices, capabilities (e.g., device attributes) of these devices, etc.).

Accordingly, responsive to gateway device 190 receiving an instruction from virtual gateway device 185D, a command and response generator 192 of gateway device 190 parses and/or decodes the instruction. Command and response generator 192 uses data from the instruction to determine a device controlled by the gateway device 190 to update. Command and response generator 192 may additionally determine a communication protocol to use for communicating with the device and a command to send to the device based on data in the instruction. Additionally, the instruction may include specific packets to use to create the command. Command and response generator 192 may use such data to generate the command and send the command to the device 135B-C. Thus, gateway device 190 is able to create commands for managed devices 135B-C without having local information about such devices.

In the example of a virtual ZIGBEE® gateway, virtual gateway device 185D includes information that identifies devices 135B-C as particular types of ZIGBEE® devices that each include one or more specified ZIGBEE® clusters. For example, virtual gateway device 185D may include or have access to a data store (e.g., a database) that identifies device 135B as a ZIGBEE® smartplug device with a device serial number (DSN) of device number 5 and a specific MAC address. The data store may additionally indicate which clusters are included in device 135B. Thus, virtual gateway device 185D may use this information to generate an instruction that identifies which device the instruction is directed to (e.g., device number 5), a cluster ID for the cluster of the device that the instruction is directed to (e.g., cluster 6), a command to send to the device (e.g., command 1), a value associated with the command (if the command accepts a value), a specific MAC address of the device to send the command to, and/or one or more specific packets of information that will form the command that is to be generated. The physical gateway device 190 may then use the information from the instruction to generate command 1 for cluster 6 of device 5 and send the command to the specific MAC address of the ZIGBEE® device.

An instruction sent to gateway device 190 may include a unique instruction identifier, which may be a random value, a monotonically increasing numerical value, or some other value. Gateway device 190 may wait for a response to the sent command from the device 185B-C, and may forward the response to virtual gateway device 185D. In one embodiment, responsive to receiving the response, command and response generator generates a new response to send to the virtual gateway device 185D. This may include, for example, packaging the response from the device 135B-C into an IP communication format and adding the unique instruction identifier to the packaged response. Gateway device 190 may then transmit the response to virtual gateway device 185D.

Virtual gateway device 185D may wait for confirmation that the attribute or parameter of the device has been updated before causing a corresponding attribute of a corresponding virtual device 185B-C. Alternatively, the virtual device 185B-C may be updated before receiving confirmation from that the attribute has been updated on the physical device (referred to as a "best effort" implementation). If the appropriate virtual device 185B-C has not yet been updated, virtual gateway device 185D updates the virtual device after receiving the response.

In some instances, a state change for a property or attribute of a device 135B-C may be originated on the device itself (e.g., if a user manually turns on or off the device). In such an instance, the device 135B-C sends a notice of the changed attribute/property to the gateway device 190. Gateway device 190 may not contain logic to interpret or understand the notice. Instead, command and response generator 192 may forward the notice to virtual gateway device 185D. In one embodiment, command and response generator 192 packages the notice in a format communicable over an IP network, and sends the packaged notice to virtual gateway device 185D. Virtual gateway device 185D may then unpackage and read the notice to determine what has occurred (e.g., to determine the changed attribute/property of the device 135B-C), and may send a command to the appropriate virtual device 185B-C to cause it to undergo the same change to the attribute/property.

In one embodiment, WAN-accessible services 130 include a template manager 126 and a virtual device manager 128. The template manager 126 creates, modifies and otherwise manages a pool of device templates. Template manager 126 may generate and/or modify templates without users performing any programming. In one embodiment, template manager 126 provides a user interface (e.g., a graphical user interface) that enables users to easily define device attributes in a device template.

Each device template defines one or more attributes/properties for a device 135A-C or gateway device 190. The attributes may be physical attributes that are hard wired, hard coded or manufactured into the device 135A-C or gateway device 190. Examples of such physical attributes include sensors and sensor capabilities, input devices (e.g., buttons) and operations of the input devices, output devices (e.g., speakers, a display, etc.) and operations of the output devices, servos and servo settings, motors and motor settings, and so forth. Physical attributes may additionally include capabilities, behaviors, characteristics, etc. of firmware and/or software that is loaded into the devices 135A-C or gateway device 190 (e.g., into embedded systems 150A-C) in the devices.

Each device template additionally defines one or more logical or behavioral attributes for a device 135A-C or gateway device 190. Logical attributes (also referred to as behavioral attributes) may include business logic such as behaviors, notifications, rules, access control, derived properties, and so forth that may not be programmed into a device. The logical attributes may instead be provided by a virtual device 185A-C or virtual gateway device 185D on behalf of a physical device 135A-C or physical gateway device 190.

In an example, a thermostat controlled by gateway device 190 may include temperature set points and controls for changing the temperature set points. A virtual device established for the thermostat may include a rule stating that a temperature minimum of 70 degrees Fahrenheit is to be applied at 7:00 AM on weekdays. The virtual device may change the temperature set point to 70 degrees Fahrenheit internally and may send a request to the virtual gateway device to forward an associated instruction to gateway device 190. Gateway device 190 may parse the instruction, generate a command to change the set point to 70 degrees Fahrenheit, and send the command to the physical device. In this example, the temperature set point and the controls usable to set the temperature set point would be considered physical attributes of the physical device, and the rule for controlling when to change the temperature set point would be considered a logical attribute assigned to the physical device.

The template manager 126 additionally associates templates to devices 135A-C and/or gateway device 190. In one embodiment, template manager 126 associates each type of device with a particular template or combination of templates. A device type may include a particular manufacturer (OEM), a particular model number and/or a particular version number (e.g., a firmware version number). Thus, different templates may be used based on manufacturer, device model and/or firmware version.

New types of devices 135B-135C may be developed and added to a location after gateway device 190 has already been deployed to that location. Additionally, existing types of devices may evolve such that new attributes are added over time. For such new devices or modified devices to be supported by a traditional gateway device, that gateway device would undergo a firmware update. However, firmware updates consume network bandwidth, can render devices non-operational, take time, introduce added testing and support cost, and so on. Accordingly, it can be advantageous to manufacture and deploy gateway devices that are capable of supporting new devices without undergoing a firmware update. Embodiments described herein provide such a gateway device via use of the virtual gateway device 185D. In order for gateway device 190 to support a new type of device, a new template may be added to template manager 126, and the virtual gateway device 185D may be updated using the new template. However, in embodiments no changes are made to the physical gateway device 190 in order to support the new type of device.

Virtual device manager 128 generates an instance of a virtual device 185A-C for each physical device 135A-C and an instance of virtual gateway device 185D for gateway device 190. The physical devices 135A-C may each have the same device type or may have different device types from the same or different manufacturers. For example, a separate virtual device 185A-C may be created for each unit of a particular product of an OEM.

Each virtual device 185A-D is generated from one or a set of device templates. The created virtual device 185A-D inherits device attributes from each of the device templates used to create the virtual device. The virtual device 185A-D is then connected to a particular physical device 135A-C, 190 (e.g., to an embedded system 150A-C of a particular physical device 135A-C), and may be used to monitor, interface with, and control that physical device. For devices 135B-C that are managed by gateway device 190, the virtual device 185B-C may connect to virtual gateway device 185D, virtual gateway device 185D may connect to gateway device 190, and gateway device 190 may connect to the devices 135B-C.

Server computing devices 125B include one or more third-party services 162. Third-party services 162 may be services provided by entities other than a provider of an IoT platform that includes WAN-accessible services 130. As shown, server computing devices 125B may connect to server computing device 125A directly or via WAN 170. Examples of third-party services include weather services (e.g., that provide live weather feeds), time services (e.g., an atomic clock), a rich site summary (RSS, also known as really simple syndication) feed, earthquake data for an area (e.g., usable to shut off utilities in the event of a large earthquake), an OEM-hosted service that keeps track of customer payments (e.g., usable to turn off device controls if payment is not received), and so on. For actions involving external services, a user may enter their credentials or go through an authorization procedure to provide authorization to perform actions on the user's behalf with regards to the external services.

Virtual devices 185A-D may interface with third-party services 162 on behalf of associated physical devices 135A-C and/or gateway device 190. Virtual devices 185A-D may interface with the third-party services 162 to obtain information usable to update the devices. Additionally, virtual devices 185A-D may interface with the third-party services 162 to provide notifications and information about physical devices 135A-C and/or gateway device 190.

Computing devices 105A-B may include portable devices such as electronic book readers, portable digital assistants, mobile phones, laptop computers, portable media players, tablet computers, cameras, video cameras, netbooks, notebooks, and the like. Computing devices 105A-B may also include traditionally stationary devices such as desktop computers, gaming consoles, digital video disc (DVD) players, media centers, and the like. Computing devices 105 may connect to the WAN 170, to the LAN 165 and/or to another LAN (not shown). As shown, computing devices 105A are connected to the WAN 170 and computing devices 105B are connected to the LAN 165, and through the LAN 165 to WAN 170 and server computing device 125A.

Computing devices 105A-B may include a remote control application (or multiple remote control applications) 115A-B that can receive information for devices 135A-C and control the devices 135A-C via virtual devices 185A-C and/or virtual gateway device 185D. The remote control application 115A-B is configured to interface with one or more virtual devices 185A-C, and may issue commands to the connected virtual devices 185A-C. The virtual devices 185A-C may then format the commands into a protocol used by associated physical devices 185A-C and/or generate new commands in such a protocol. For devices 135B-C controlled by gateway device 190, the corresponding virtual devices 185B-C may generate a request or command and send the request or command to virtual gateway device 185D. Virtual gateway device 185D may generate an instruction for the gateway device 190 that includes all of the information that gateway device 190 might need to generate a command for the devices 135B-C, and send the instruction to gateway device 190. Command and response generator 192 may parse the instruction to determine contents of the instruction, and may then generate the command based on those contents. In one embodiment, the command may be generated even though the gateway device 190 does not include local information on a network of devices controlled by the gateway device 190. Instead, such information, as related to the device to be controlled, may be included in the received instruction. The gateway device 190 may then send the command to the physical device 135B-C (e.g., via the devices' embedded systems 150B-C) via a communication protocol used by that device to control the physical device 135B-C.

The remote control application 115A-B may be programmed to run on various operating systems, such as Windows® operating systems, Unix® operating systems, iOS® operating systems, Android® operating systems and Java® operating systems to name a few. The remote control application 115A-B may also be configured as firmware, or as hardware, or as some combination of software, firmware and/or hardware. The remote control application 115A-B may include a graphical user interface (GUI) that enables users to interact with and control devices 135A-C in an intuitive and user-friendly manner. A user may interact with the GUI to cause the remote control application to generate notifications, commands, property updates and other messages for the devices represented in the GUI.

Computing devices 105A-B may connect to server computing device 125A and control virtual devices 185A-D via the WAN 170 and/or LAN 165. These virtual devices may then control physical devices 135A-C and gateway device 190. Additionally, if computing device is connected to LAN 165, then the remote control application 115A-B may enter a LAN mode, and may connect to gateway device via the LAN 165, bypassing the server computing device 125A. This may reduce lag in instances where the computing devices 105A-B are connected to LAN 165. In one embodiment, remote control applications 115A-B automatically switches to LAN mode responsive to connecting to LAN 165.

For the LAN mode, remote control application 115A-B and gateway device 190 dynamically establish a secure connection using security information received from server computing device 125A. Both remote control application 115A-B and gateway device 190 may generate a shared secret based on information received from WAN-accessible services 130, or may simply receive such a shared secret from WAN-accessible services 130.

While remote control application 115A-B is in LAN mode, virtual device gateway 185D may not be accessed by remote control application 115A-B. Accordingly, in one embodiment remote control application 115A-B contains a copy of managed device data that defines the types of devices that may be managed by the gateway device 190, the device attributes of these devices, how to communicate with or control these devices, and so on. The remote control application 115A-B may also include a data store with information on a network managed by the gateway device 190 (e.g., including information on all of the devices managed by the gateway, how to communicate with these devices, capabilities (e.g., device attributes) of these devices, commands usable to control these devices, etc.). Thus, remote control application 115A-B can generate an instruction similar to the instructions that are generated by virtual gateway device 185D, and may send the instruction to gateway device 190. Gateway device 190 may then decode the instruction, parse it, and generate a command from it. Once the command has been sent to a device 135B-C and the device 135B-C has been updated based on the command, gateway device 190 may send a report to virtual gateway device 185D indicating the executed command. Virtual gateway device 185D may then update the virtual device 185B-C that corresponds to the modified device 135B-C accordingly.

The WAN-accessible services 130 and/or remote control application 115A-B may include a visualizer (not shown) that can generate a graphical representation of a network of devices managed by gateway device 190. For a ZIGBEE® mesh network, the graphical representation may show how each device in the ZIGBEE® mesh network is connected to each other device. The graphical representation may show an accurate depiction of the states of all devices on the network based on the states of the virtual devices 185A-C. Thus, an accurate graphical representation can be provided without querying the gateway device 190.

Figure 2:
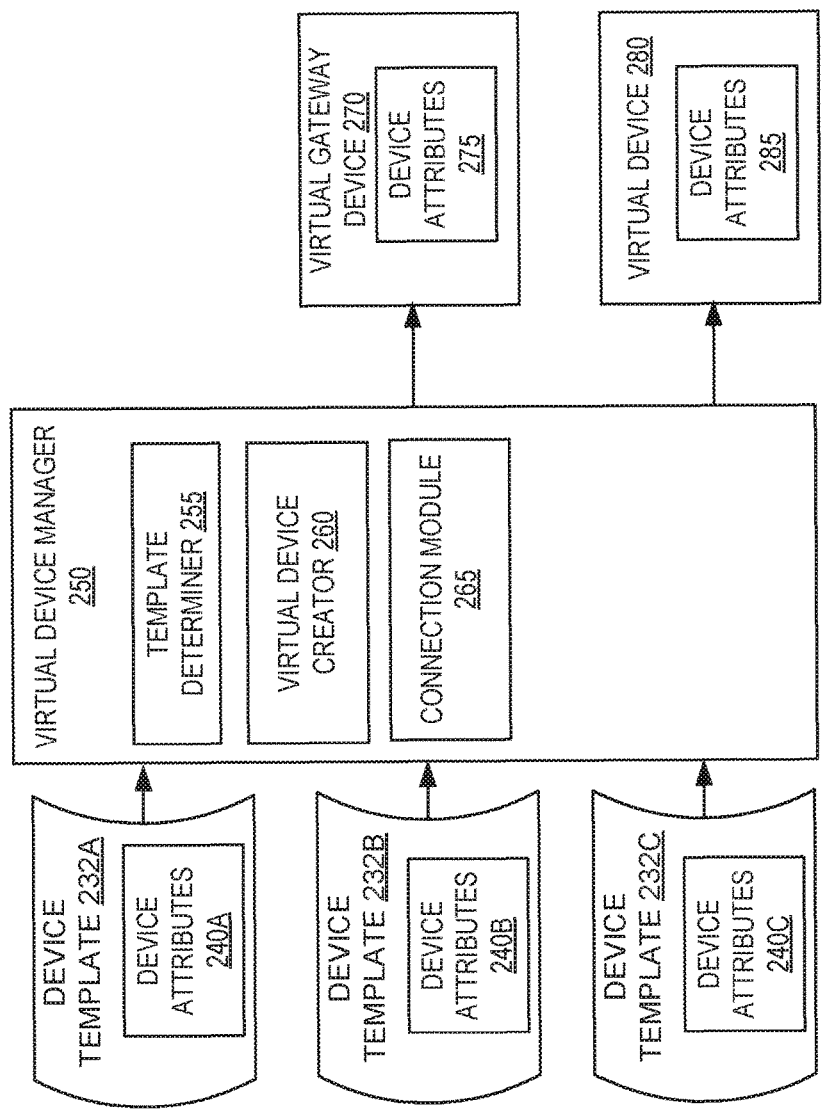
FIG. 2 is a block diagram of a virtual device manager, in accordance with one embodiment of the present invention.

FIG. 2 is a block diagram of a virtual device manager 250, in accordance with one embodiment of the present invention. In one embodiment, virtual device manager 250 corresponds to virtual device manager 128 of FIG. 1. Virtual device manager 250 includes functionality for creating virtual devices and connecting virtual devices together and to physical devices. The virtual device manager 250 includes a template determiner 255, a virtual device creator 260 and a connection module 265. Alternatively, the functionality of the template determiner 255, virtual device creator 260 and/or connection module 265 may be divided into additional modules or may be combined into a single module.

When a gateway device is connected to a network, that gateway device may send a message to virtual device manager 250 notifying virtual device manager 250 of that gateway device. The notification may include information identifying a particular device model, an OEM, a version number, a media access control (MAC) address, a serial number, a network address of the gateway device, etc. The notification may also identify a type of communication protocol that the gateway device uses to manage remote devices (e.g., ZIGBEE®, BLUETOOTH®, etc.) and/or other information.

Template determiner 255 may use the provided information to determine a device type for the gateway device. Template determiner 255 may additionally determine which device templates 232A-C are associated with that device type, where each of the device templates 232A-C includes different device attributes 240A-C. Template determiner 255 may then invoke virtual device creator 260 and pass to virtual device creator 260 the network address of the gateway device and an identification of the device templates 232A-C associated with that gateway device.

Virtual device creator 260 generates a virtual gateway device 270 from the identified device templates 232A-C associated with the gateway device. The virtual gateway device 270 may be a data structure that mimics the physical gateway device. The virtual gateway device 260 inherits device attributes 240A-C from the device templates 232A-C, which together make up device attributes 275. The device attributes 275 may include a superset of attributes that the physical gateway device actually has (e.g., of physical device attributes). For example, device attributes 275 may additionally include logical device attributes that are implemented by a server computing device on behalf of the gateway device. The fact that some operations of the gateway device are performed on the server (e.g., in the cloud), and that other operations are actually performed on the physical gateway device may be transparent to end users. Once the virtual gateway device 270 is created, connection module 265 connects the virtual gateway device 270 to the physical gateway device.

When a physical device to be managed by a gateway device first connects to the gateway device (e.g., initiates commissioning for ZIGBEE® or pairing for BLUETOOTH®), that physical device may send a message to the gateway device that includes information identifying the device and all attributes of the device. In one embodiment, the gateway device interrogates the device, asking for identification of all attributes of the device. The gateway device may then forward the information to virtual gateway device 270. The information may include information identifying a particular device model, an OEM, a version number, a first unique device identifier of the device (e.g., a media access control (MAC) address, a serial number, a network address of the physical device, etc.), and so forth. The first unique identifier may be the identifier or address used by the physical gateway device to refer to the device. The contents of the information may depend on a type of device and a communication protocol used by the device. For example, the information received from a device that communicates using ZIGBEE® may be different from the information received from a device that communicates using BLUETOOTH®.

In the example of a ZIGBEE® device, the device would be interrogated using the ZIGBEE® protocol, and would identify one or more clusters that define the ZIGBEE® device. The ZIGBEE® specification provides standards for different ZIGBEE® clusters. In ZIGBEE® a cluster is a group of commands and attributes that define what a device can do. A device can support one or more clusters. A device may include generic clusters that apply to many types of devices, profile specific clusters that are associated with specific ZIGBEE® application profiles (e.g., a home automation profile, a smart energy profile, a telecommunication services profile, a health care profile, and so on), and/or manufacturer specific profiles that are defined by a device manufacturer. Some ZIGBEE® cluster examples are 0x0006 (On/Off switch), 0x0008 (level control), For example, a ZIGBEE® device may respond that it is defined by clusters 0x0005, 0x0006 and 0x0007. The virtual gateway device, upon receiving such information, may record the information about the new ZIGBEE® device.

Template determiner 255 may use the provided information to determine a device type for the device. Template determiner 255 may additionally determine which device templates 232A-C are associated with that device type. Template determiner 255 may then invoke virtual device creator 260 and pass to virtual device creator 260 the first unique identifier of the device and an identification of the device templates 232A-C associated with that device. Some of the device templates 232A-C may be mini-templates or sub-templates that may be combined to form a node template for a specific device node. A node template may be used to create a virtual device that is a virtual representation of a physical device. In one embodiment, device templates 232A-C include separate cluster templates, were each cluster template provides capabilities for a specified ZIGBEE® cluster. Accordingly, if a device uses ZIGBEE® clusters 0x0005, 0x0006 and 0x0007, then the cluster templates for each of these clusters may be used along with one or more additional device templates to construct a node template for a specific device or specific type of device.

Virtual device creator 260 generates a virtual device 280 from the identified device templates 232A-C associated with the device. Thus, the virtual device 280 inherits device attributes 285 from the device templates 232A-C associated with the device. Virtual device creator 260 may additionally generate a second unique identifier (referred to herein as a device serial number (DSN)) for the virtual device 280. The second unique identifier may be the identifier or address used by a WAN-accessible service to refer to the virtual device 280. The virtual device 280 may be a data structure that mimics the physical device. A separate virtual device is created for each physical device controlled by the gateway device.

The virtual gateway device 270 is updated to indicate that the virtual gateway device 270 controls or manages the virtual device. This may include adding information about the virtual device and/or associated physical device to a network table of the virtual gateway device 270. Such information may include, for example, the first unique address of the physical device, the second unique address of the virtual device 280, a communication protocol used by the device, and so on.

The example of a ZIGBEE® virtual gateway device will now be described. ZIGBEE® is a specification for a suite of high level wireless mesh network communication protocols used to create personal area network (PANs). For simplicity, ZIGBEE® will be described herein as a single protocol, though it should be understood that it is actually a suite of communication protocols. ZIGBEE® devices can transmit data over long distances by passing data through a mesh network of intermediate devices to reach more distant ones. A ZIGBEE® gateway device may connect a ZIGBEE® device to an IP network even though the gateway device is not directly connected to that ZIGBEE® device. Instead, the ZIGBEE® gateway may be connected to an intermediate ZIGBEE® device, which may connect to the ZIGBEE® device via a mesh network.

For ZIGBEE®, each ZIGBEE® device is defined by one or more clusters. Clusters are defined by the ZIGBEE® alliance and specification. Each cluster represents one or more functionalities and is made up of one or more attributes and commands associated with the one or more attributes. The commands are usable to adjust values of the one or more attributes of the cluster. Some example types of functionality include on/off functionality (boolean data type), temperature functionality (integer type), power and metering functionality, and so on. For example, a ZIGBEE® smartplug could implement an On/Off cluster, which contains a single attribute for the On/Off status and three commands, including an on command, an off command and a toggle command.

The IoT platform may include a different device template for each cluster. Such device templates may be referred to herein as cluster templates. Cluster templates are made of up the attributes and commands of a particular cluster. For example, the on/off cluster in the ZIGBEE® specification contains attribute 0x0000, which is for on/off status, and the three commands of on, off and toggle. The on/off cluster template may be defined in a similar manner.

Typically a ZIGBEE® device (also referred to as a ZIGBEE® node) is made up of multiple clusters. In such an instance, template determiner 255 determines which clusters are associated with a ZIGBEE® device and select the corresponding cluster templates for those clusters. Virtual device creator 260 then dynamically merges the multiple cluster templates into a virtual device. For example, suppose that a ZIGBEE® smartplug implements the clusters on/off, basic and over-the-air (OTA). When the ZIGBEE® smartplug device is commissioned (added) onto the network, the gateway interrogates the node to determine the clusters that define the node, and forwards this information to the virtual ZIGBEE® gateway. Virtual device creator 260 merges an on/off ZIGBEE® cluster template, a basic ZIGBEE® cluster template and an OTA ZIGBEE® cluster template to create a virtual ZIGBEE® smartplug. In one embodiment, these three cluster templates are merged to form a ZIGBEE® smartplug template. When a new ZIGBEE® smartplug device is detected, this single ZIGBEE® smartplug template may be used to generate a new virtual ZIGBEE® smartplug device in the cloud. This allows for high scalability because new features can easily be added by defining new cluster templates in the cloud without updating the physical ZIG-BEE® gateway device.

Figure 3:
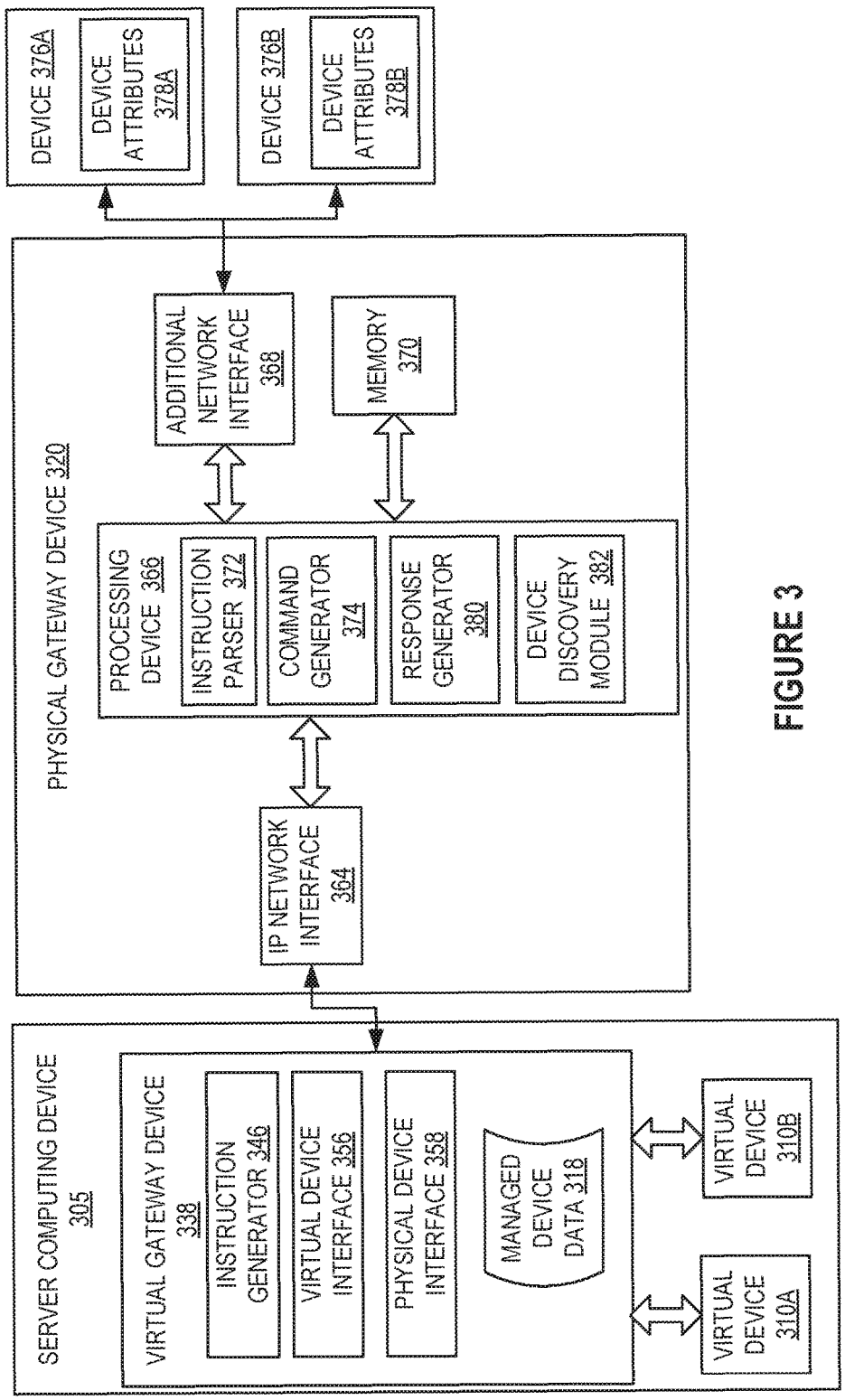
FIG. 3 is a block diagram depicting a virtual gateway device that interfaces with a physical gateway device.

FIG. 3 is a block diagram depicting interactions between a physical gateway device 320 and a virtual gateway device 338 that is a virtual representation of the physical gateway device 320. The physical gateway device 320 manages multiple devices 376A-B. A server computing device 305 hosts virtual gateway device 338 as well as multiple virtual devices 310A-B managed by virtual gateway device 338. In one embodiment, devices 376A-B initially perform a pairing or commissioning procedure to add the device to a network managed by the physical gateway device 320, which causes corresponding virtual devices 310A-B to be generated by server computing device 305 and paired or commissioned to virtual gateway device 338.

Virtual gateway device 338 may include all of the physical attributes of the physical gateway device 320 as well as logical attributes that the physical gateway device 320 may not inherently possess. Examples of such logical attributes include derived properties, notification rules, business logic (e.g., roles, additional rules, registration techniques, etc.), and so on. In one embodiment, virtual gateway device 338 includes an instruction generator 346, a virtual device interface 356 and a physical device interface 358. Alternatively, the functionality of one or more of the instruction generator 346, virtual device interface 356 and/or physical device interface 358 may be merged into a single module or divided into additional modules.

Virtual device interface 356 receives messages from virtual devices 310A-B and sends messages to virtual devices 310A-B. For example, a user may instruct a virtual device 310A-B to update an attribute (e.g., may instruct it to turn on, to turn off, to change a setting, and so on). In response, the virtual device 310A-B may generate a request for the virtual gateway device 338 to cause the corresponding physical device to perform the same attribute update. Alternatively, a user may interact with a device 376A-B directly to cause an attribute of the device to change. Such change information may be propagated to the virtual gateway device 338 (as described below), and the virtual device interface 356 may send a command to the corresponding virtual device 310A-B to cause the same attribute to change on the virtual device 310A-B.

Unlike traditional gateway devices, physical gateway device 320 may not have a local network map of devices 376A-B managed by physical gateway device 320. Instead, such information may be part of managed device data 318 maintained by virtual gateway device 338. The managed device data 318 may include a network map that identifies each virtual device 310A-B managed by virtual gateway device 338 as well as the physical devices 376A-B that correspond to those virtual devices 310A-B. The network map may include first unique identifiers (e.g., MAC addresses) that uniquely identify the devices 376A-B to physical gateway device 320 as well as second unique identifiers (e.g., DSNs) that uniquely identify the virtual devices 310A-B to the virtual gateway device 338. The network map may be implemented as a table, list, database, or other file or data structure. Each entry in the network map may include the first unique identifier of a device, and may also include the second unique identifier of the corresponding virtual device. Entries may also indicate attributes of devices, commands accepted by the devices, and so on.

In the case of a ZIGBEE® gateway, bindings may be performed between ZIGBEE® devices. A binding in ZIG-BEE® is a match of an input cluster of one ZIGBEE® device and an output cluster of another ZIGBEE® device. A binding may be associated with an incoming or outgoing data flow in a device. Bindings may be stored in binding tables, which are tables of source and destination pairs. In one embodiment, binding tables are maintained by the virtual gateway device 338 and included in managed device data 318. Other information for a ZIGBEE® network that may be included in the managed device data 318 includes information for translating between attribute updates and ZIGBEE® commands, information on groups, information on scenes, and so on.

A virtual ZIGBEE® gateway may provide enhancements to bindings. In one embodiment, the virtual ZIGBEE® gateway device provides checks to make sure that a valid ZIGBEE® binding can be created between two devices. For example, one check would make sure that the "from" device (also referred to as a source node) has an output cluster and the "to" device (also referred to as a destination node) has an input cluster. If a binding is attempted between devices, but a device identified as a source device does not have an output cluster or a device identified as a destination device does not have an input cluster, then the virtual gateway device 338 may output an error and/or notify a user of the failed binding.

ZIGBEE® devices can be arranged into groups. In ZIG-BEE®, a group is two or more ZIGBEE® devices that can be controlled together. Group addressing may be used to communicate with groups of devices. For example, a single "on" command may be sent to the on/off cluster of multiple devices arranged in a group. These devices may be the same type of devices (e.g., multiple ZIGBEE® light bulbs) or may be different types of devices (e.g., every ZIGBEE® device in a room, regardless of device type).

In ZigBee, a scene is the settings of the clusters of one or more ZIGBEE® devices. A scene may include any number of ZIGBEE® devices. For example, a scene may include the states of all ZIGBEE® devices in a household or all ZIG-BEE® devices in a room. An example "sleep" scene may cause all ZIGBEE® lights and appliances in the household to turn off. A "movie" scene may cause all the lights in a room to turn off, a television and receiver to turn on, and the receiver to select a specific equalizer setting. A virtual ZIGBEE® gateway may provide enhancements to scenes. In one embodiment, the virtual ZIGBEE® gateway device automatically stores a snapshot of the attribute values for a ZIGBEE® device when that ZIGBEE® device is added to a scene. Additionally, in embodiments scenes are stored by virtual gateway device 338 in managed device data 318 rather than by physical gateway device 320. Thus, scenes can be retrieved and edited without communicating with the physical gateway device 320 or the physical devices included the scenes. Accordingly, embodiments can simplify adding devices to scenes, removing devices from scenes, and otherwise altering and managing scenes.

Virtual gateway device 338 may independently determine that an attribute of a device should be changed (e.g., based on a rule maintained by virtual gateway device 338). Alternatively, virtual gateway device 338 may receive an instruction/request to update an attribute of a device. Such an instruction may be received from a virtual device 310A-B, from a third-party service, from a user interface, or from another source. After determining that an attribute of a device is to be changed, virtual gateway device 338 invokes instruction generator 346.

Instruction generator 346 generates an instruction for the physical gateway device to initiate the attribute update on the physical device. The generated instruction may contain all of the details of an action to be performed (e.g., for an attribute update). Such details may include a device MAC address (or other unique identifier of the device), an identifier of an attribute to modify, an identifier of a command to generate, one or more packets that may make up the command, an identifier of a value for the attribute, and so on. Thus, in one embodiment the instruction includes all of the data that the physical gateway device will use to generate a command and send the command to the device. In the example of a ZIGBEE® gateway, the instruction would also include a cluster identifier of a cluster whose attribute is to be modified.

Since the physical gateway device 320 does not include a network map of devices managed by physical gateway device 320, the instruction will include the first unique identifier used by the physical gateway device to address the device (e.g., a MAC address of the device). The instruction may additionally include an identifier of the command to send to the device, one or more packets to include in the command, and/or a value to adjust an attribute to. The instruction may additionally include other information such as a unique instruction identifier.

Physical device interface 358 sends messages to, and receives messages from, physical gateway device 320. In one embodiment, such messages are sent using a transmission control protocol/internet protocol (TCP/IP) connection. Alternatively, a notification message (e.g., using user datagram protocol (UDP)) may be sent from the server computing device 305 to the physical gateway device 320, notifying the physical gateway device 320 to fetch messages from the computing device 305 using TCP/IP.

Physical gateway device 320 includes an IP network interface, a processing device 366, an additional network interface 368 and a memory 370. Physical gateway device 320 may also include other components not described herein. IP network interface 364 (also referred to as an IP network adapter) receives messages from, and sends messages to, virtual gateway device 338 over a WAN and/or LAN. IP network interface 364 may be, for example, an Ethernet network adapter, a WI-FI™ network adapter, and so on.

Additional network interface 368 is a wireless or wired adapter that is used to communicate with devices 376A-B managed by physical gateway device 320. Additional network interface 368 may be a ZIGBEE® module, a BLUETOOTH® module, a power line communication (PLC) module, or other wired or wireless communication module.

Processing device 366 is connected to IP network interface 364, additional network interface 368 and memory 370. Processing device 366 may represent one or more general-purpose processors such as a microprocessor, central processing unit, or the like. Processing device 366 may also be one or more special-purpose processing devices such as an application specific integrated circuit (ASIC), a field programmable gate array (FPGA), a digital signal processor (DSP), network processor, or the like. Processing device 366 is configured to execute instructions for performing the operations and steps discussed herein. The instructions in one embodiment include an instruction parser 372, a command generator 374, a response generator 380 and a device discovery module 382. Such instructions may also reside in memory 370, and may be loaded into processing device 366 during operation of physical gateway device 320. Memory 370 may include volatile and/or nonvolatile memory devices, such as Flash, random access memory (RAM), read only memory (ROM), and so forth.

As mentioned previously, physical gateway device 320 may not include a definition of types of devices that may be managed by the gateway device, the device attributes of these devices, and/or how to communicate with or control these devices. Additionally, physical gateway device 320 may not include a local data store with information on a local network managed by the gateway device (e.g., including information on all of the local devices managed by the gateway, how to communicate with these devices, capabilities (e.g., device attributes) of these devices, etc.). Accordingly, each instruction generated by instruction generator 346 contains a subset of such information that can be used to generate an appropriate command for a managed device 376A-376B.

Upon receipt of an instruction from virtual gateway device 338, instruction parser 372 parses the instruction to determine the information that can be used to generate a command. By parsing the instruction, instruction parser 372 may determine what type of command to generate, packets to include in the command, how to structure the command, an attribute to be modified by the command, a new value for the attribute, which device to generate the command for, how to send the command to the device, a network address of the device, a communication protocol to use for sending the command to the device, and so on. Command generator 374 may than use the identified information to generate the command. Once the command is generated, command generator 374 may send the command to the appropriate device 376A-B via additional network interface 368. The device 376A-B may execute the command, which may cause the device to change an attribute of the device in accordance with the command.

After a device 376A-B executes a command (or fails to execute a command), the device sends a response back to physical gateway device 320. Physical gateway device 320 may not understand response (e.g., may not include firmware or software capable of determining a meaning of the response). Instead, response generator 380 may forward the response to virtual gateway device 338, which may determine whether or not the attribute update was successfully carried out based on contents of the response.

In one embodiment, an instruction received by physical gateway device 320 from virtual gateway device 338 includes a unique instruction identifier. The instruction identifier may be a monotonically increasing value, a random value, or some other value assigned to the instruction that can be used to distinguish that instruction from other instructions. Response generator 380 may temporarily store the instruction identifier until a response to a command is received from a device that the command was directed to. Response generator 380 may then generate a new response based on the received response. In one embodiment, response generator 380 reformats the response for transmission over an IP network connection and/or adds the temporarily stored unique instruction identifier to the response. Therefore, when the virtual gateway device 338 receives the response, it can determine which instruction the response is responsive to and then update the appropriate virtual device (if the virtual device was not already updated). Response generator 380 then sends the response to virtual gateway device 338.

Device discovery module 382 is responsible for performing device discovery. When a device has not been paired with any gateway device, that device may transmit a pair request or commissioning request, which may include attribute information about the device and a unique identifier of the device. Device discovery module 382 detects such a pair/commissioning request, and forwards the request to virtual gateway device 338. This may include packaging the request for transmission over an IP network. Virtual gateway device 338 receives the request and updates managed device data 318 to add the new device. Virtual gateway device may additionally provide an instruction to physical gateway device 320 that causes physical gateway device to send an appropriate response to the pair/commissioning request back to the device. This may cause the physical gateway device to pair to or commission the device, though the information about the pairing/commissioning may be stored at virtual gateway device 338 rather than at physical gateway device 320. As a result of the pairing/commissioning, a new virtual device is also generated by server computing device 305 to represent the new device. This new virtual device 310A-B is connected to virtual gateway device 338. Note that the specific protocol, procedures and information exchanged during pairing or commissioning may depend on a communication protocol used by additional network interface 368 and the device 376A-B. For example, a pairing procedure for connecting to a BLUETOOTH® device may be different than a commissioning procedure for connecting to a ZIG-BEE® device.

FIGS. 4A-7 are flow diagrams showing various methods of implementing a virtual gateway device to augment and control the functionality of a physical gateway device and of a physical gateway device that operates on instructions from a virtual gateway device. The methods may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by a server computing device executing a virtual gateway device (e.g., server computing device 125 of FIG. 1). Other embodiments may be performed by a physical gateway device that is associated with a virtual gateway device.

Figure 4A:
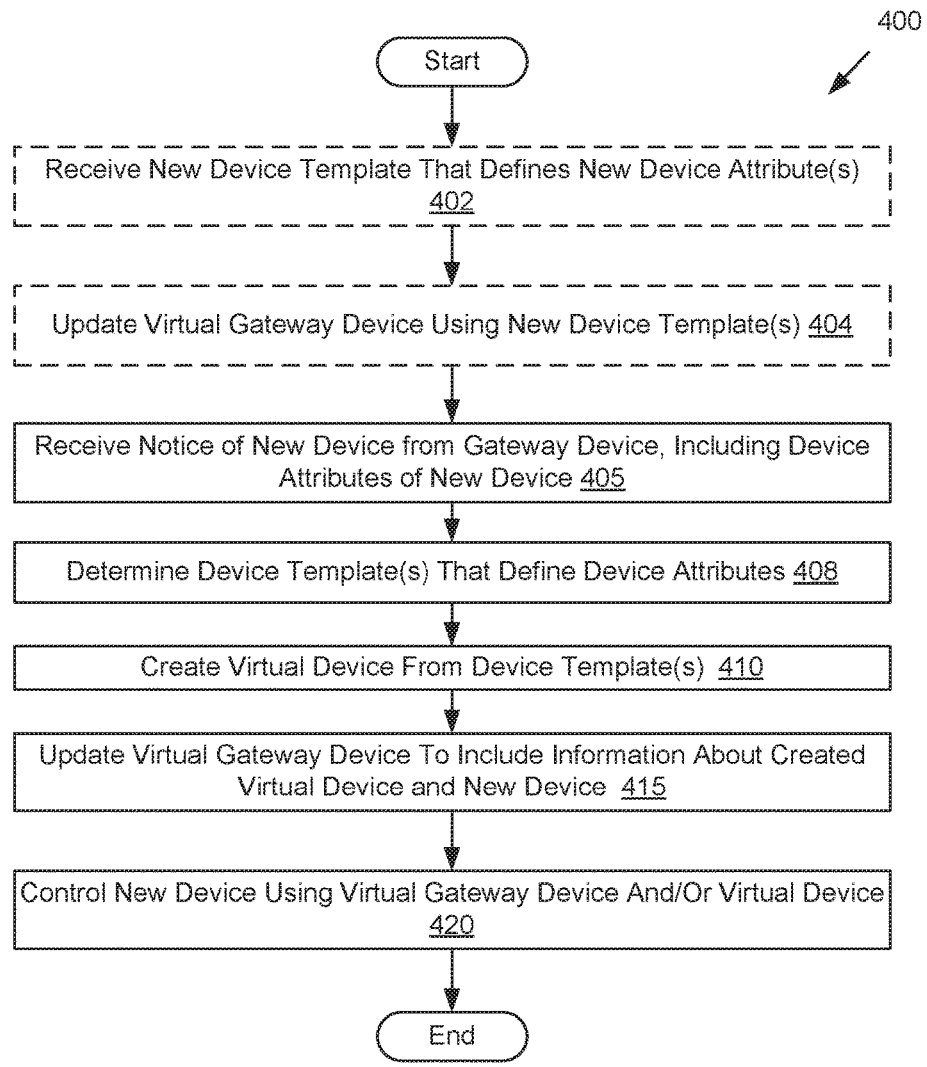
FIG. 4A is a flow chart of one embodiment for a method of pairing a gateway device to a new device using a virtual gateway device.

FIG. 4A is a flow chart of one embodiment for a method 400 of pairing a gateway device to a new device using a virtual gateway device. The new device may be an entirely new type of device, or an existing type of device that has new attributes, which may have been developed after the gateway device was deployed to the field (e.g., to a customer location). Thus, support for the new device may not have been available when the gateway device was manufactured. Support for the new device can easily be added to the gateway device simply by updating a virtual gateway device that is a virtual representation of the gateway device, and without updating a firmware or software of the gateway device. To add such support, at block 402 of method 400 a new device template (or multiple new device templates) that defines device attributes of the new device is received. A new device template that defines device attributes of a gateway device for communicating with the new device may also be received. At block 404, these new device templates may then be used to update a virtual gateway device to add support for the new device to the virtual gateway device.

At block 405, processing logic receives a notice of a new device from the gateway device. The notice may include attributes of the new device as well as a unique identifier (e.g., MAC address or other network address) of the new device. At block 408, processing logic determines device templates that define the attributes of the new device. These may include device templates received at block 402 and/or preexisting device templates.

At block 410, processing logic creates a virtual device from the determined device templates. This may include assigning a second unique identifier (e.g., DSN) to the virtual device. At block 415, processing logic updates the virtual gateway device to include information about the newly created virtual device and the associated new device virtually represented by the newly created virtual device. Processing logic may additionally send an instruction to the gateway device that will cause the gateway device to send an appropriate message to the device for completing a process of pairing the device to the gateway device.

At block 420, processing logic then controls the new device using the virtual gateway device and the virtual device.

Figure 4B:
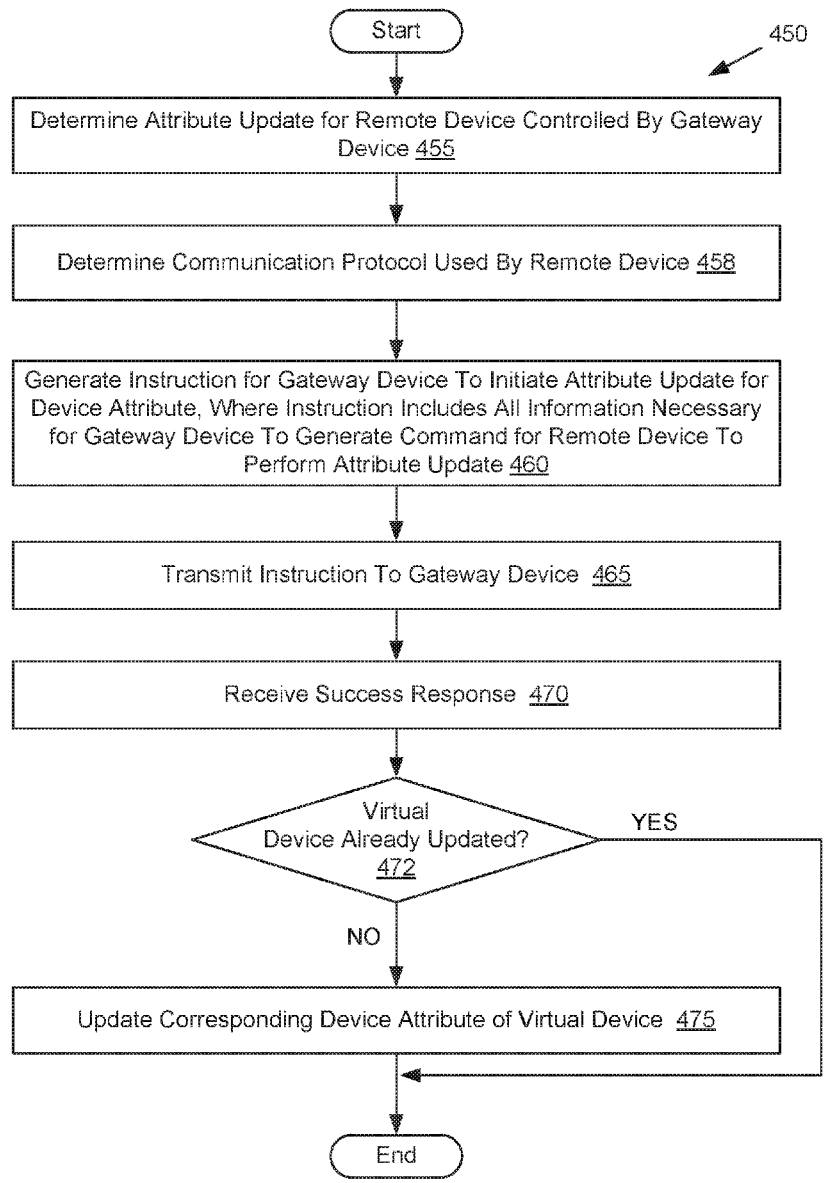
FIG. 4B is a flow chart of one embodiment for a method of using a virtual gateway device to control a physical gateway device.

FIG. 4B is a flow chart of one embodiment for a method 450 of using a virtual gateway device to control a physical gateway device. At block 455 of method 450, processing logic determines an attribute update for a remote device controlled by a gateway device. In one embodiment, processing logic receives an instruction to perform the attribute update from a virtual device associated with the remote device. Alternatively, processing logic may determine the attribute update based on a rule or schedule. For example, a schedule may indicate that a device is to turn on at a specified time.

At block 458, processing logic may determine a communication protocol used by the remote device. At block 460, processing logic generates an instruction for the gateway device. The instruction may be an instruction to initiate an attribute update for a device attribute of the remote device. In one embodiment, the instruction includes all information that enables the gateway device to generate a command for the remote device to perform the attribute update. For example, the instruction may include a MAC address of the device to be update, a cluster ID (for ZIGBEE® devices), an attribute ID of an attribute to be updated, a command ID of a command to perform for the attribute update, one or more packets of data for generating the command (e.g., specific logic for the command), and so on. In one embodiment, the instruction is formatted as a JSON embedded string.

At block 465, processing logic transmits the instruction to the gateway device. At block 470, processing logic receives a response indicating whether or not the instruction was successful (e.g., whether that attribute update was successfully performed on a device). At block 472, processing logic determines whether the virtual device corresponding to the remote device has already been updated to reflect the attribute update on the remote device. In a best effort implementation, the attribute may be updated on the virtual device before or in parallel with updating of the attribute on the physical device. In such an implementation, the method ends after receiving the success response. In an update upon confirmation scenario, the virtual device is not updated until a success response is received. In such a scenario, after receiving the success response the method continues to block 475. Processing logic then updates the corresponding device attribute of the virtual device at block 475. The method then ends.

Figure 5:
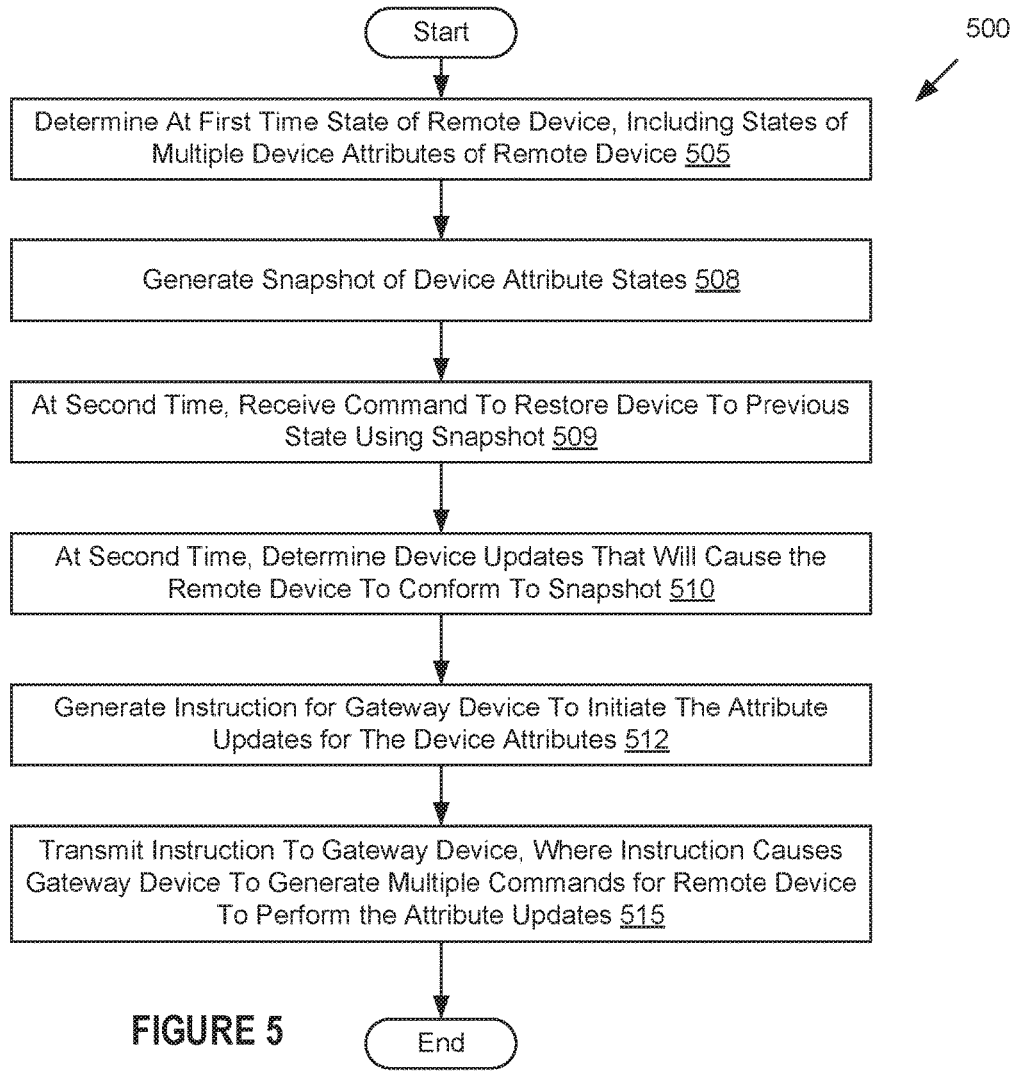
FIG. 5 is a flow chart of one embodiment for a method of acquiring, storing and applying a snapshot of a device's attribute states.

FIG. 5 is a flow chart of one embodiment for a method 500 of acquiring, storing and applying a snapshot of a device's attribute states. At block 505 of method 500, processing logic determines at a first time states of multiple device attributes of a remote device. The states of each device attribute may be reflected in the states of a virtual device that is a virtual representation of that remote device. Accordingly, the states of the attributes for the remote device may be determined from the states of the device attributes for the virtual device. At block 508, processing logic generates a snapshot of the device attribute states of the virtual device. The snapshot may be a file or data structure that includes a set of key value pairs, where each key represents an attribute, and each value represents an attribute value.

At block 509, at a second time processing logic determines to restore the remote device to the state of the snapshot. For example, a user may send a command to revert to the snapshot, or the determination can be made based on a rule or schedule. At block 510, processing logic determines device attribute updates that will cause the remote device to conform to the snapshot.

At block 512, processing logic generates an instruction (or multiple instructions) for the gateway device to initiate the device attribute updates for the device attributes on the remote device. At block 515, processing logic transmits the instruction (or instructions) to the gateway device. The instruction (or instructions) will cause the gateway device to generate one or multiple commands for the remote device to perform the attribute updates. The remote device will then have the same state as the state shown in the snapshot. Note that the states of the device attributes in the virtual device corresponding to the remote device would also be updated, either using a best effort implementation or an upon confirmation implementation.

In embodiments method 500 can be applied to multiple devices. Accordingly, a snapshot may be a snapshot of the states of multiple different devices (referred to as a scene in ZIGBEE®). The snapshot can later be used to revert all of the devices represented in the snapshot to the states that they had when the snapshot was generated.

Figure 6:
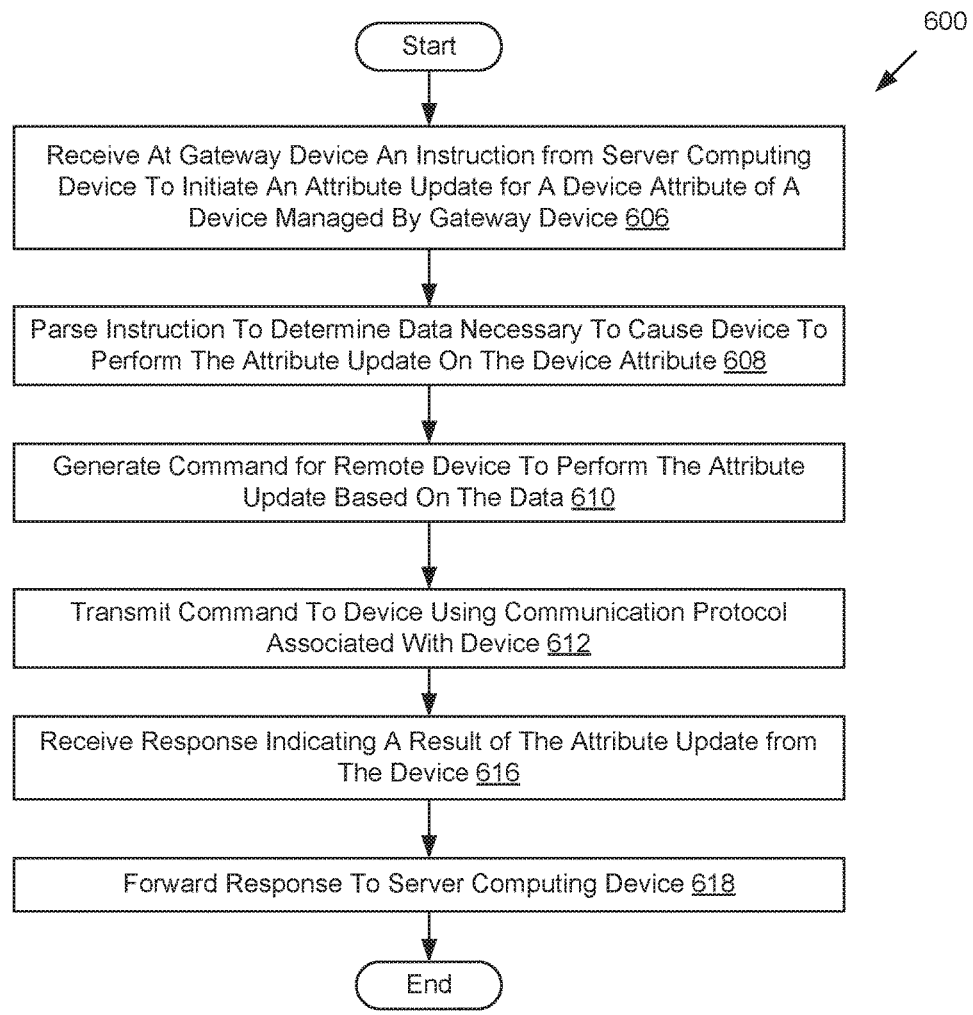
FIG. 6 is a flow chart of one embodiment for a method of controlling a device by a gateway device based on information received from a virtual gateway device.

FIG. 6 is a flow chart of one embodiment for a method 600 of controlling a device by a gateway device based on information received from a virtual gateway device. At block 606 of method 600, a gateway device receives an instruction from a server computing device to initiate an attribute update for a device attribute of a device managed by the gateway device. At block 608, the gateway device parses the instruction to determine data usable to cause the device to perform the attribute on the device attribute. In one embodiment, the instruction is encoded (e.g., as a JSON encoded string). In such an embodiment, processing logic may decode the instruction before parsing it.

At block 610, processing logic generates a command for the remote device to perform the attribute update based on the data from the parsed instruction. In a ZIGBEE® example, the information may include a MAC address, a cluster ID, an attribute ID, a command ID and/or one or more command packets, which may be used to construct the command. At block 612, processing logic transmits the command to the device using a communication protocol associated with the device (e.g., using ZIGBEE® or BLUETOOTH®). At block 616, the gateway device receives a response from the device. The response may indicate a success or failure of the attribute update. At block 618, processing logic then forwards the response to the server computing device (e.g., to a virtual gateway device running on the server computing device). In one embodiment, to forward the response processing logic reformats the response for transmission over a TCP/IP connection. In one embodiment, processing logic determines an instruction identifier included in the received instruction and adds the instruction identifier to the response.

Figure 7:
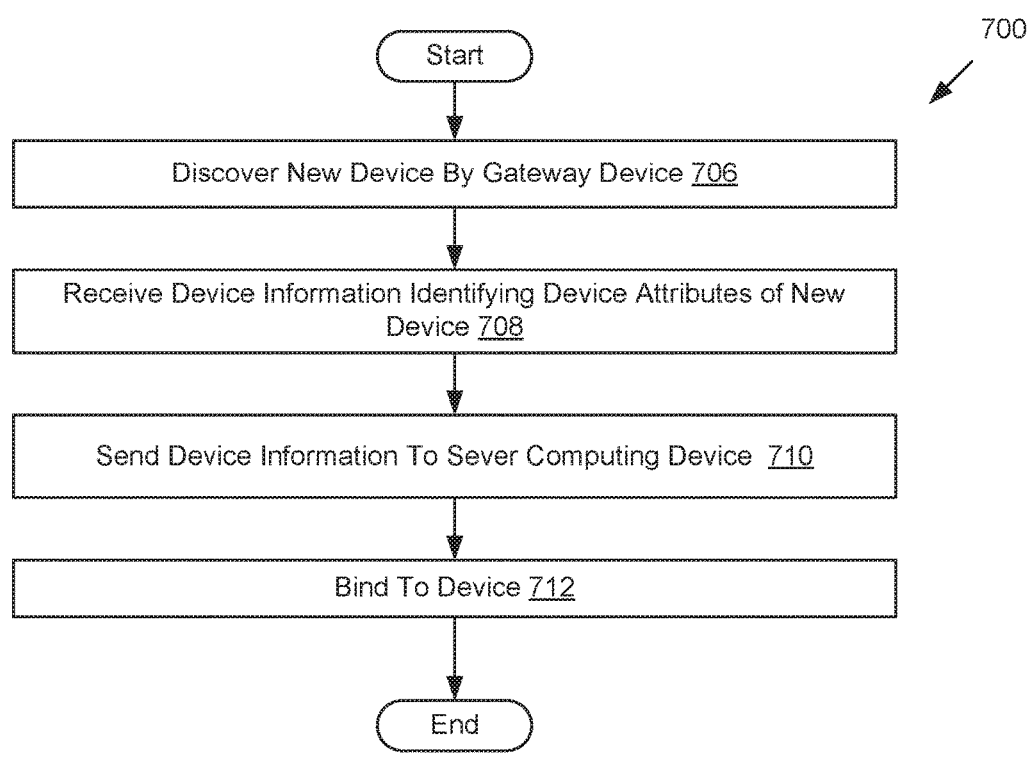
FIG. 7 is a flow chart of one embodiment for a method of pairing to or commission a new device.

FIG. 7 is a flow chart of one embodiment for a method 700 of pairing to or commissioning a new device by a gateway device. At block 706 of method 700, a gateway device discovers a new device. At block 708, the gateway device receives device information from the new device identifying device attributes of the new device. At block 710, the gateway device forwards the device information to a virtual gateway device running in a server computing device. At block 712, processing logic pairs to the device. This may include receiving a pairing instruction from the virtual gateway device, generating a pair command based on the pairing instruction, and sending the pair command to the device.

Figure 8:
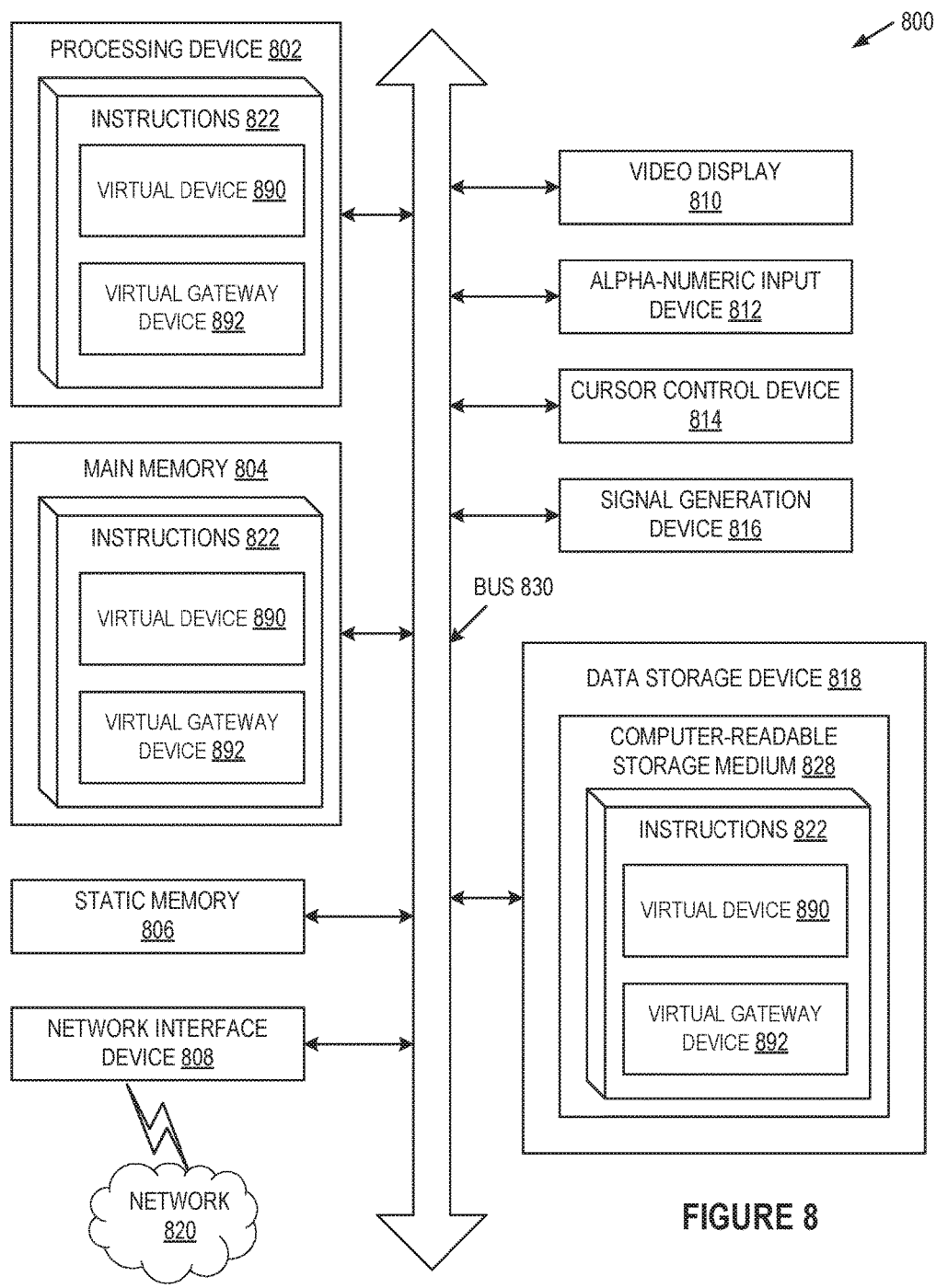
FIG. 8 illustrates a block diagram of one embodiment of a computing device.

FIG. 8 illustrates a diagrammatic representation of a machine in the example form of a computing device 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 818), which communicate with each other via a bus 830.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations and steps discussed herein.

The computing device 800 may further include a network interface device 808. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium (or more specifically a computer-readable storage medium) 828 on which is stored one or more sets of instructions 822 embodying any one or more of the methodologies or functions described herein. The instructions 822 may also reside, completely or at least partially, within the main memory 804 and/or within the processing device 802 during execution thereof by the computing device 800, the main memory 804 and the processing device 802 also constituting computer-readable storage media.

The computer-readable storage medium 828 may also be used to store a virtual device 890 and/or a virtual gateway device 892 (as described with reference to FIG. 3), and/or a software library containing methods that call a virtual device 890 and/or virtual gateway device 892. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-3) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "creating", "establishing", "controlling", "translating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   determining, by a server computing device, an attribute update for a first device attribute of a remote device controlled by a gateway device;
   updating a second device attribute of a virtual device, wherein the virtual device is a virtual representation of the remote device;
   generating, by the server computing device via a virtual gateway device that is a virtual representation of the gateway device, an instruction for the gateway device to initiate the attribute update for the first device attribute, wherein the virtual gateway device comprises information on at least one of a) types of devices that are manageable by the gateway device, b) device attributes of the types of devices, c) how to communicate with the types of devices, or d) a network of devices managed by the gateway device, and wherein the gateway device lacks the information on at least one of a) the types of devices that are manageable by the gateway device, b) the device attributes of the types of devices, c) how to communicate with the types of devices, or d) the network of devices managed by the gateway device; and
   transmitting the instruction to the gateway device, wherein the instruction causes the gateway device to generate a command for the remote device to perform the attribute update on the device attribute.

2. The method of claim 1, further comprising:
   determining, based on the virtual device, a communication protocol used by the remote device, wherein the gateway device is to transmit the command to the remote device using the communication protocol.

3. The method of claim 2, wherein the communication protocol is a wireless mesh network protocol, and wherein the instruction comprises a network address of the remote device, a cluster identifier of the remote device, and an attribute identifier of the remote device.

4. The method of claim 2, wherein the communication protocol is a frequency-hopping spread spectrum (FHSS) wireless communication protocol that uses short-wavelength ultra-high frequency (UHF) radio waves in an industrial, scientific and medical (ISM) radio band from 2.4 to 2.485 GHz.

5. The method of claim 1, wherein the command comprises a unique instruction identifier, the method further comprising:
receiving a response from the gateway device indicating a result of the attribute update, the response comprising the unique instruction identifier; and
updating the second device attribute of the virtual device responsive to receiving the response.

6. The method of claim 1, further comprising:
receiving a message from the gateway device after the gateway device connects to the remote device, the message comprising a plurality of device attributes of the remote device;
determining a plurality of device templates that define the plurality of device attributes; and
creating the virtual device from the plurality of device templates, wherein the virtual device inherits the plurality of device attributes from the plurality of device templates.

7. The method of claim 6, wherein the first device attribute was not supported when the gateway device was manufactured, the method further comprising:
receiving a new device template associated the first device attribute of the remote device prior to receiving the message, wherein the new device template is one of the plurality of device templates, and wherein the instruction causes the gateway device to generate the command for the remote device to perform the attribute update on the first device attribute without the gateway device having been updated to support the first device attribute.

8. The method of claim 1, further comprising:
determining, at a first time, states of a plurality of device attributes of the remote device;
generating a snapshot of the remote device, the snapshot comprising the states of the plurality of device attributes at the first time;
determining, at a second time, a plurality of attribute updates that will cause the remote device to conform to the snapshot;
generating an additional instruction for the gateway device to initiate the plurality of attribute updates for the plurality of device attributes; and
transmitting the additional instruction to the gateway device, wherein the additional instruction causes the gateway device to generate a plurality of additional commands for the remote device to perform the plurality of attribute updates.

9. The method of claim 1, wherein the gateway device manages a network comprising a plurality of remote devices that share a common communication protocol, and wherein the server computing device maintains a plurality of virtual devices, each of the plurality of virtual devices corresponding to one of the plurality of remote devices, the method further comprising:
generating a visual representation of the network based on states of the plurality of virtual devices.

10. A gateway device comprising:
a first network interface to connect to an internet protocol (IP) network;
a second interface to connect to one or more devices; and
a processor, connected with the first network interface and the second interface, the processor to:
discover a device, wherein discovering the device comprises receiving from the device information identifying a plurality of device attributes of the device;
pair to the device;
send the information and a result of the pairing to a server computing device via the first network interface, wherein the server computing device is to generate a virtual device based on a plurality of templates corresponding to the plurality of device attributes;
receive an instruction from a second virtual device via the first network interface, wherein the instruction is to initiate an attribute update for the device, wherein the second virtual device is a virtual representation of the gateway device, wherein the second virtual device comprises information on at least one of a) types of devices that are manageable by the gateway device, b) device attributes of the types of devices, c) how to communicate with the types of devices, or d) a network of devices managed by the gateway device, and wherein the gateway device lacks the information on at least one of a) the types of devices that are manageable by the gateway device, b) the device attributes of the types of devices, c) how to communicate with the types of devices, or d) the network of devices managed by the gateway device;
parse the instruction to determine data to cause the device to perform the attribute update;
generate a command for the device to perform the attribute update based on the data; and
transmit the command to the device via the second interface.

11. The gateway device of claim 10, wherein the instruction comprises a unique instruction identifier, and wherein the processor is further to:
receive, from the device via the second interface, a response indicating a result of the attribute update; and
forward the response to the server computing device via the first network interface, wherein the gateway device does not understand the response and the forward of the response comprises the unique instruction identifier.

12. The gateway device of claim 10, wherein the second interface uses a wireless mesh network protocol, and wherein the instruction comprises a network address of the device, a cluster identifier of the device, and an attribute identifier of the device.

13. The gateway device of claim 10, wherein the second interface uses a frequency-hopping spread spectrum (FHSS) wireless communication protocol that uses short-wavelength ultra-high frequency (UHF) radio waves in an industrial, scientific and medical (ISM) radio band from 2.4 to 2.485 GFIz.

14. A non-transitory computer readable storage medium comprising instructions that, when executed by a processing device, cause the processing device to perform operations comprising:
receiving, by the processing device, a message from a gateway device after the gateway device connects to a remote device, the message comprising a plurality of device attributes of the remote device;
determining, by the processing device, a plurality of device templates that define the plurality of device attributes;
creating, by the processing device, a virtual device from the plurality of device templates, wherein the virtual device is a virtual representation of the remote device and inherits the plurality of device attributes from the plurality of device templates;

determining, by the processing device, an attribute update for a first device attribute of the remote device;

updating a second device attribute of the virtual device;

generating, by the processing device via a virtual gateway device that is a virtual representation of the gateway device, an instruction for the gateway device to initiate the attribute update for the first device attribute, wherein the virtual gateway device comprises information on at least one of a) types of devices that are manageable by the gateway device, b) device attributes of the types of devices, c) how to communicate with the types of devices, or d) a network of devices managed by the gateway device, and wherein the gateway device lacks the information on at least one of a) the types of devices that are manageable by the gateway device, b) the device attributes of the types of devices, c) how to communicate with the types of devices, or d) the network of devices managed by the gateway device; and transmitting the instruction to the gateway device, wherein the instruction causes the gateway device to generate a command for the remote device to perform the attribute update on the device attribute.

15. The non-transitory computer readable storage medium of claim 14, the operations further comprising:

determining, based on the virtual device, a communication protocol used by the remote device, wherein the gateway device is to transmit the command to the remote device using the communication protocol.

16. The non-transitory computer readable storage medium of claim 14, wherein the command comprises a unique instruction identifier, the operations further comprising:

receiving a response from the gateway device indicating a result of the attribute update, the response comprising the unique instruction identifier; and updating the second device attribute of the virtual device responsive to receiving the response.

17. The non-transitory computer readable storage medium of claim 14, the operations further comprising:

determining, at a first time, states of a plurality of device attributes of the remote device;

generating a snapshot of the remote device, the snapshot comprising the states of the plurality of device attributes at the first time;

generating, at a second time, an additional instruction for the gateway device to initiate a plurality of attribute updates for the plurality of device attributes, wherein the plurality of attribute updates cause the remote device to conform to the snapshot; and transmitting the additional instruction to the gateway device, wherein the additional instruction causes the gateway device to generate a plurality of additional commands for the remote device to perform the plurality of attribute updates.

18. The non-transitory computer readable storage medium of claim 14, wherein the gateway device manages a network comprising a plurality of remote devices that share a common communication protocol, and wherein the processing device maintains a plurality of virtual devices, each of the plurality of virtual devices corresponding to one of the plurality of remote devices, the operations further comprising:

generating a visual representation of the network based on states of the plurality of virtual devices.

19. The non-transitory computer readable storage medium of claim 14, wherein the device attribute was not supported when the gateway device was manufactured, the operations further comprising:

receiving a new device template associated the device attribute of the remote device prior to receiving the message, wherein the new device template is one of the plurality of device templates, and wherein the instruction causes the gateway device to generate the command for the remote device to perform the attribute update on the device attribute without the gateway device having been updated to support the device attribute.

20. The non-transitory computer readable storage medium of claim 14, wherein the gateway device uses a wireless mesh network protocol to communicate with the remote device, and wherein the instruction comprises a network address of the remote device, a cluster identifier of the remote device, and an attribute identifier of the remote device.

* * * * *